(12) United States Patent
Bader

(10) Patent No.: US 7,931,837 B2
(45) Date of Patent: Apr. 26, 2011

(54) METHOD FOR CONTROLLING THE INJECTION MOLDING PROCESS OF AN INJECTION MOLDING MACHINE

(75) Inventor: Chistopherus Bader, Neftenbach (CH)

(73) Assignee: Priamus Systems Technologies AG, Schaffhausen (CH)

( * ) Notice: Subject to any disclaimer, the term of this patent is extended or adjusted under 35 U.S.C. 154(b) by 177 days.

(21) Appl. No.: 11/916,454

(22) PCT Filed: Jun. 2, 2006

(86) PCT No.: PCT/EP2006/005304
§ 371 (c)(1),
(2), (4) Date: Dec. 4, 2007

(87) PCT Pub. No.: WO2006/131278
PCT Pub. Date: Dec. 14, 2006

(65) Prior Publication Data
US 2008/0230937 A1    Sep. 25, 2008

(30) Foreign Application Priority Data

Jun. 10, 2005   (DE) .......................... 10 2005 027 121
Jun. 24, 2005   (DE) .......................... 10 2005 029 705

(51) Int. Cl.
B29C 45/78    (2006.01)

(52) U.S. Cl. ...................... 264/40.1; 264/40.5; 264/40.6
(58) Field of Classification Search ................. 264/40.1, 264/40.6, 237; 425/123
See application file for complete search history.

(56) References Cited

U.S. PATENT DOCUMENTS

| | | | |
|---|---|---|---|
| 5,411,686 A | 5/1995 | Hata | |
| 5,720,912 A | 2/1998 | Liehr et al. | |
| 6,090,318 A | 7/2000 | Bader et al. | |
| 2004/0084794 A1 | 5/2004 | Frey | |
| 2004/0131715 A1 * | 7/2004 | Frey | ............................. 425/143 |

FOREIGN PATENT DOCUMENTS

| | | |
|---|---|---|
| DE | 198 03 352 | 8/1999 |
| DE | 19803352 A1 * | 8/1999 |
| JP | 59217119 | 12/1984 |

* cited by examiner

Primary Examiner — Philip C Tucker
Assistant Examiner — Vicki Wu
(74) Attorney, Agent, or Firm — Bachman & LaPointe, P.C.

(57) ABSTRACT

A method for controlling the injection molding process of an injection molding machine with an injection molding tool that forms at least one cavity for a molded part to be produced, wherein a melt is introduced into the cavity by an incision. The temporal progression of the temperature of the mold wall is determined and controlled in the course of the injection molding process.

9 Claims, 2 Drawing Sheets

METHOD FOR CONTROLLING THE INJECTION MOLDING PROCESS OF AN INJECTION MOLDING MACHINE

BACKGROUND OF THE INVENTION

The invention relates to a method for controlling the cooling time in an injection molding process of an injection molding machine having an injection molding mold which forms at least one cavity for an injection molded part to be produced, with a melt being introduced into the cavity through an ingate.

The injection molding process of a conventional injection molding machine is in principle subdivided into various time phases, to be precise:
closing of the mold,
injection of the melt,
holding pressure time,
cooling time for the injection molded part.
opening of the mold,
removing of the injection-molded part.

While the opening, closing and removal processes take up about 35%, the injection process 5% and the holding pressure phase 10% of the time profile of a cycle, the cooling time always takes up 50%. Since, nowadays, there is a requirement for ever shorter cycle times, development attention is being paid to shortening this time.

There are various possible ways to calculate the cooling time, and it is virtually impossible to distinguish between the mathematical equations. By way of example, the following calculation is known:

$$t_{cool} = \frac{s^2}{\pi^2 * a_{eff}} * \ln\left(\frac{4}{\pi} * \frac{T_M - T_W}{T_E - T_W}\right)$$

$t_{cool}$=cooling time [s]
s=average wall thickness of the molding [mm]
$a_{eff}$=thermal conductivity
$T_M$=melt temperature of the plastic
$T_E$=mold removal temperature of the plastic part
$T_W$=mold wall temperature These or similar formulae are generally used in order to calculate the cooling time for a molding, or to estimate it roughly before production. The injection molding process is then controlled on the basis of this rough estimate.

Recently, a cooling time control process has become available whose purpose is to determine the shortest possible cooling times for each cycle during production in order then to automatically terminate the cycle at this moment, and to open the mold in order to remove the molding. In this cooling time control process, the wall thickness of the molding and the thermal conductivity of the plastic are used as input variables, together with the melt temperature and the mold removal temperature, once these have been determined. The critical point in this case is the maximum value of the mold wall temperature, which is determined in each cycle. At the same time, the time at which the mold internal pressure drops back to atmospheric pressure (1 bar) is also determined. These values are compared with the theoretical calculation and are then output to the machine control system as an optimized value in the form of a digital signal for opening the mold. However, in practice, it has been found that this method has scarcely made it possible to shorten the time at all. Just the choice of the various temperature sensors results in greater scatter, and in a greater measurement error.

In EP-A-0 704 293, a description is given of a method for controlling the temperature of units of an injection molding machine and molds for processing plastics.

It is pointed out that only the mold cooling or temperature control can be kept under specific control as heat dissipation from the mold. In particular, there is the necessity to control the time duration of the throughflow of the temperature medium in the mold in such a way as to compensate for disturbances of any kind that act on the heat content of the mold. Mentioned as a location for determining the temperature is that the average mold temperature is continuously measured during the entire duration of the cycle at the location that is subjected equally to the thermal loads of both the injected melt and the temperature control for the respective temperature control circuit, this location being located approximately in the region of the geometric centre between the mold contour and the cooling channel or area and in the region of the center between the cooling water inlet and outlet, at a sufficiently great distance from the mold contour, or, in the case of the cylinder temperature, in the region of the geometric center between the inner wall of the cylinder and the temperature control channel.

U.S. Pat. No. 5,411,686 relates to a method for achieving not only a constant value of the mold temperature but also a constant value of the melt temperature, and also a constant value of the temperature during the ejection of the article produced. The corresponding temperature sensors are located centrally in the mold.

The object of the present invention is to develop a method of the abovementioned type which leads to the cycle times being shortened.

SUMMARY OF THE INVENTION

The object is achieved by determining the time profile of a mold wall temperature in the cavity and by using the profile to control the cooling time.

DETAILED DESCRIPTION

Figure 1:
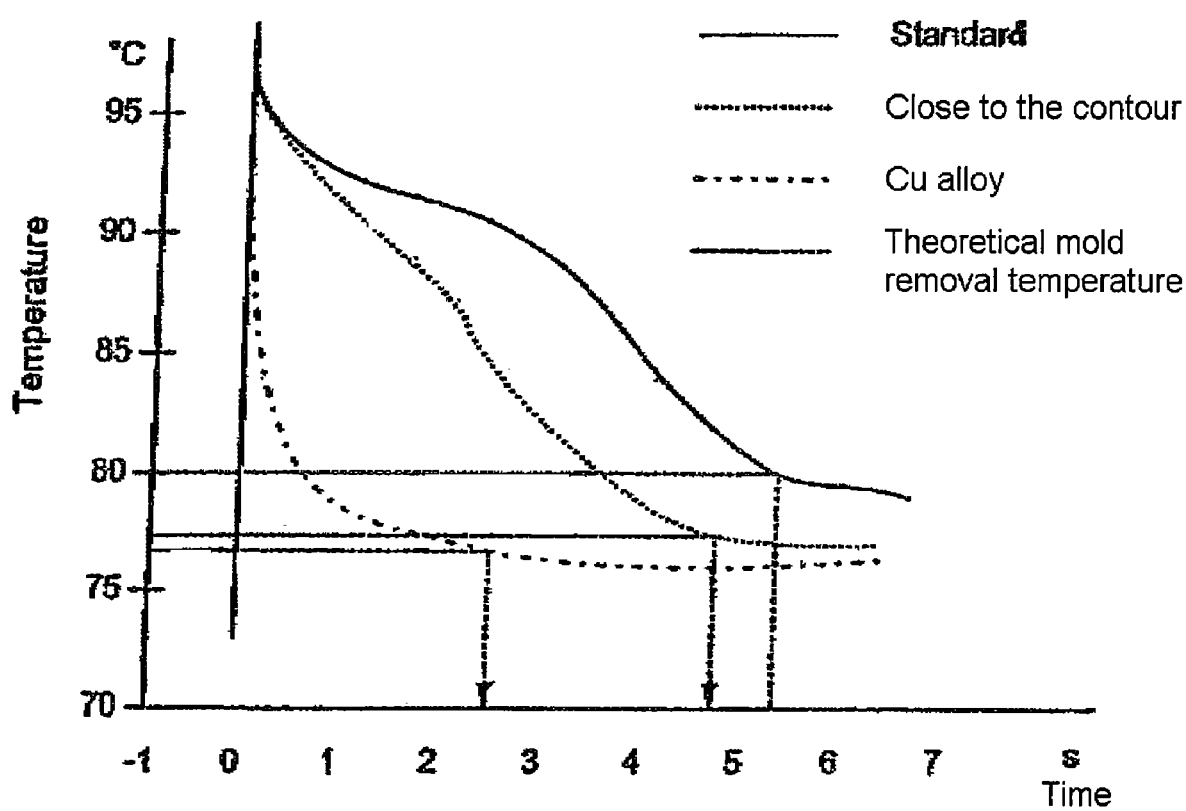
FIG. 1 shows temperature distance mould profile.

It has been found that the reason for quick removal from the mold does not lie primarily in the injection-molded part itself but in the heat dissipation in the mold. Good cooling, for example close to the surface, in principle carries the heat away more quickly than poor cooling far away from the mold surface. A core composed of copper alloy likewise dissipates the heat better than a core composed of conventional steel. An examination of the method according to the invention has found that it was possible to save up to 50% of the cooling time, in fact, by the type of cooling chosen. One factor that is worth noting is in this case is the fact that this saving is clearly reflected in the profile of the mold temperature curves (see FIG. 1).

As can clearly be seen, when using a copper alloy for the mold core, the dashed-dotted curve with the shortest cooling time collapses very quickly because of the good heat dissipation, so that removal from the mold can also be started very quickly. Although it is possible to speed the process up by cooling just close to the contour, as shown by the dotted line, this improvement is, however, not very great. With the worst type of standard cooling, as used until now, the curve also falls considerably more slowly, because of the poor heat dissipation. It should be emphasized that the maximum mold wall temperatures are virtually identical for all three curves, and this is explained by the fact that the method described in the prior art cannot function.

This means that process monitoring and process control of an injection molding machine, for example for determination of the shortest necessary cooling time, must be carried out primarily using the profile of the temperature curve and not using its maximum value. In this case, the determination is preferably made over the time profile of the mold wall temperature, or indirectly using the integral under the temperature curve.

Any change in the heat dissipation during production results in different shrinkage characteristics of the molding, and thus in different quality. Monitoring of the temperature profile, for example in the form of the integral monitoring that has been mentioned, allows inferior parts to be segregated on the basis of the varying heat dissipation.

However, the control process is preferably carried out not only as a function of the temperature profile but also as a function of the mold internal pressure, preferably at the time when the mold internal pressure reaches atmospheric pressure. Furthermore, the maximum mold wall temperature can also be used as a secondary variable, or start value.

In order to determine an optimum cooling time, an appropriate mold internal pressure sensor is preferably positioned in the vicinity of the ingate, since the mold internal pressure acts for the longest time there. The further away in the direction of the flow path end the sensor is positioned, the lower and the shorter the mold internal pressure curve is.

Figure 2:
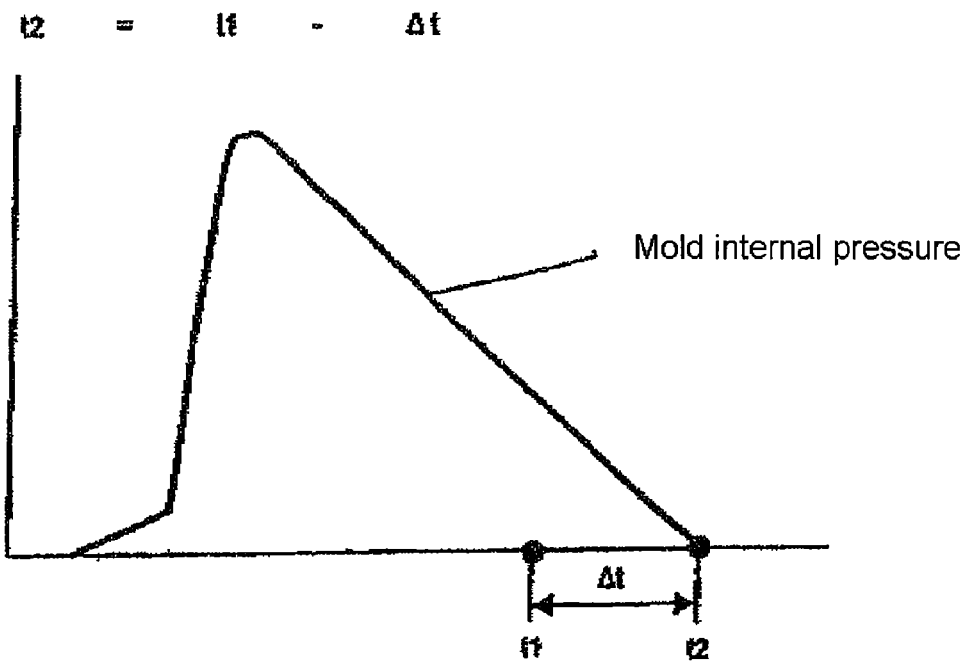
FIG. 2 shows a cooling profile of a mould in accordance with the method of the present invention.

A limit value t1 at which the mold can effectively be opened after the optimum cooling time occurs before the actual time t2 at which the mold internal pressure reaches the atmospheric pressure. This means that the optimum cooling time is always shorter than the time, measured in the vicinity of the ingate, for reaching the atmospheric pressure t2. The aim is therefore to determine the optimum cooling time t1 in real time: $t2=t1-\Delta t$. However, in this case, the invention also covers the fact that the cooling time may be longer than the time to reach the atmospheric pressure (see FIG. 2).

Figure 3:
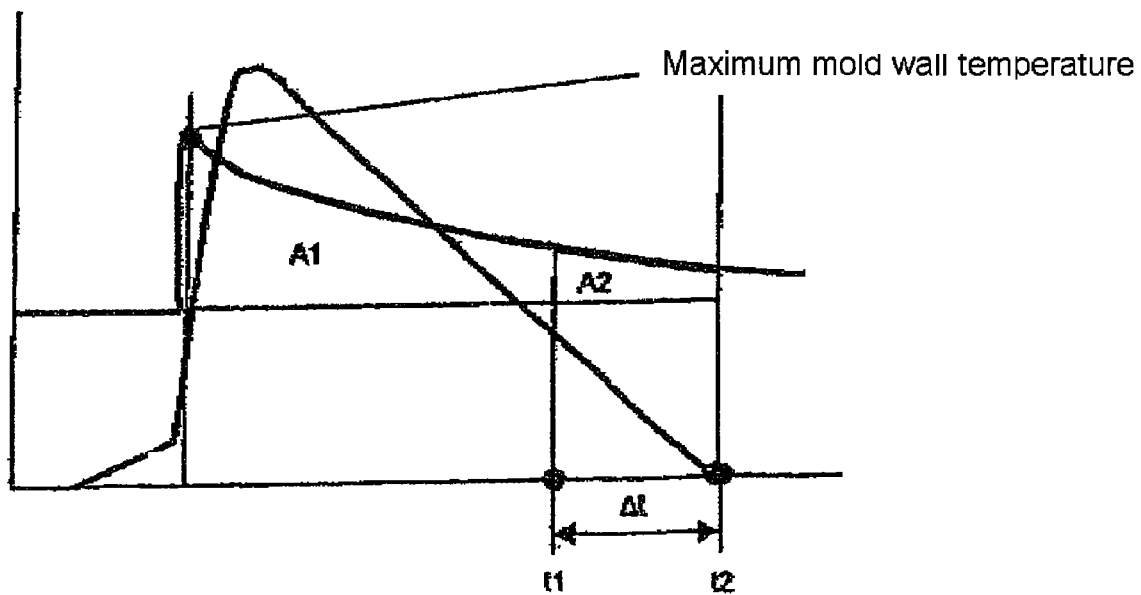
FIG. 3 shows a mould wall temperature curve in accordance with the present invention.

The governing variable for determining the optimum cooling time t1 is, however, the integral under the mold wall temperature curve (see FIG. 3).

The control process itself should therefore be carried out such that the integral under the temperature curve is added up in real time, until a specific limit value is reached at t1.

The time start value for integral formation may be chosen, for example, as mentioned above by the maximum value of the mold wall temperature curve or by the switching time to the holding pressure, or by the maximum value of the mold internal pressure. The switching point can in this case be generated automatically by means of the temperature signal or by means of a switching threshold (for example 120 bar) of the mold internal pressure.

The limit value t1 at which the mold is then effectively opened at the optimum cooling time may be determined, for example, by subtracting a specific area A2' from the total integral from the previous cycle (A1+A2). The area A2' can either be determined empirically, and/or may be calculated (A2'×X) using specific material or geometric values for the molding.

A resultant area A1 is therefore obtained for the current cycle, from which the time to open the mold can be calculated. The opening process is then carried out in real time.

In the case of a multi-cavity mold, in order to achieve the same part characteristics in a plurality of cavities, each cavity must be heat treated in the same way, with the heat-treatment medium (water, oil, electrical, etc.) being irrelevant. Ideally, the profile of the various temperature curves in the different cavities should be identical. However, before the rise in the temperature curves, the measured mold wall temperature corresponds to the mold temperature since the melt has not yet reached the sensor. The mold temperature has an inert response and can be achieved and maintained over a long period by means of the selected nominal values with heat-treatment systems of different sensitivity.

If water is used for heat treatment, the nominal temperature in the individual cavities may be achieved, however, with laminar flow (low flow) and with turbulent flow (large flow). In order to achieve actually identical temperature conditions, two control systems must therefore actually be provided, specifically the control system for the nominal temperatures of the heat-treatment appliances and the control system for heat dissipation, whose fluctuation may be seen from the profile of the temperature curves after reaching the melt, at the sensor position. If the profile of the mold temperatures for individual cavities differs in this case, then automatic matching (control) can be achieved by increasing or decreasing the flow rate. The aim of the two control systems is to achieve identical temperature relationships, using any desired number of heat-treatment circuits (and therefore any desired number of temperature signals). One precondition is for one temperature sensor to be used for each heat-treatment channel (or for each electrical heating zone).

The invention claimed is:
1. A multiple run injection molding process, comprising:
(1) providing an injection molding machine having an injection molding mold which forms at least one cavity for an injection molded part to be produced;
(2) introducing a melt into the cavity through an ingate and, thereafter, closing the cavity; and
(3) opening the cavity after an optimum cooling time t1, wherein the optimum cooling time t1 is determined in accordance with the following steps:
 (a) determining the time profile of a mold wall temperature to obtain a temperature profile; and
 (b) using the temperature profile from a time start value over time indirectly in the form of an integral calculation under the temperature curve, with the integral being added under the temperature curve to determine when a predetermined limit value (t1) is reached wherein the limit value (t1) is the optimum cooling time at which the mold is opened and where (t1) is before the actual time (t2) at which the mold internal pressure reaches atmospheric pressure, and wherein the time start value is one of:
  (i) the time at which the maximum value of the mold wall temperature curve is reached,
  (ii) the time at which the switching time to the holding pressure takes place, and
  (iii) the time at which the maximum value of the mold internal pressure is reached; and
(4) repeating steps (2) and (3) for each run of the injection molding process.

2. The injection molding process of claim 1, including monitoring the mold internal pressure and using the monitored internal pressure as a control parameter for the start time value for the calculation of the integral.

3. The injection molding process of claim 1, including determining a switching time using the mold wall temperature, and using the switching time as a control parameter for the start time value for the calculation of the integral.

4. The injection molding process of claim 2, wherein the mold internal pressure is determined close to the ingate to the cavity.

5. The injection molding process of claim 2, including monitoring the mold internal pressure and time until atmospheric pressure is reached, and using the time to reach atmospheric pressure as a control parameter.

6. The injection molding process of claim 5, including opening the mold once an optimum cooling time has elapsed whether before or after the atmospheric pressure is reached.

7. The injection molding process of claim 1, including determining the mold wall temperature in the vicinity of a flow path.

8. The injection molding process of claim 1, wherein, in the case of a multi-cavity mold, in addition to controlling the mold temperature, the profile of the mold wall temperature is made uniform by individually controlling the heat-treatment media adjacent to the individual cavities.

9. The injection molding process of claim 8, wherein, in the case of all types of injection molding molds with a plurality of heat-treatment zones and circuits, the profile of the mold wall temperature is made uniform by individually controlling the heat-treatment media in each zone and/or in each circuit.

\* \* \* \* \*